April 30, 1929.  R. G. DISHMAN  1,711,342
DEVICE FOR HOLDING MOLDINGS
Filed Feb. 10, 1928   2 Sheets-Sheet 1
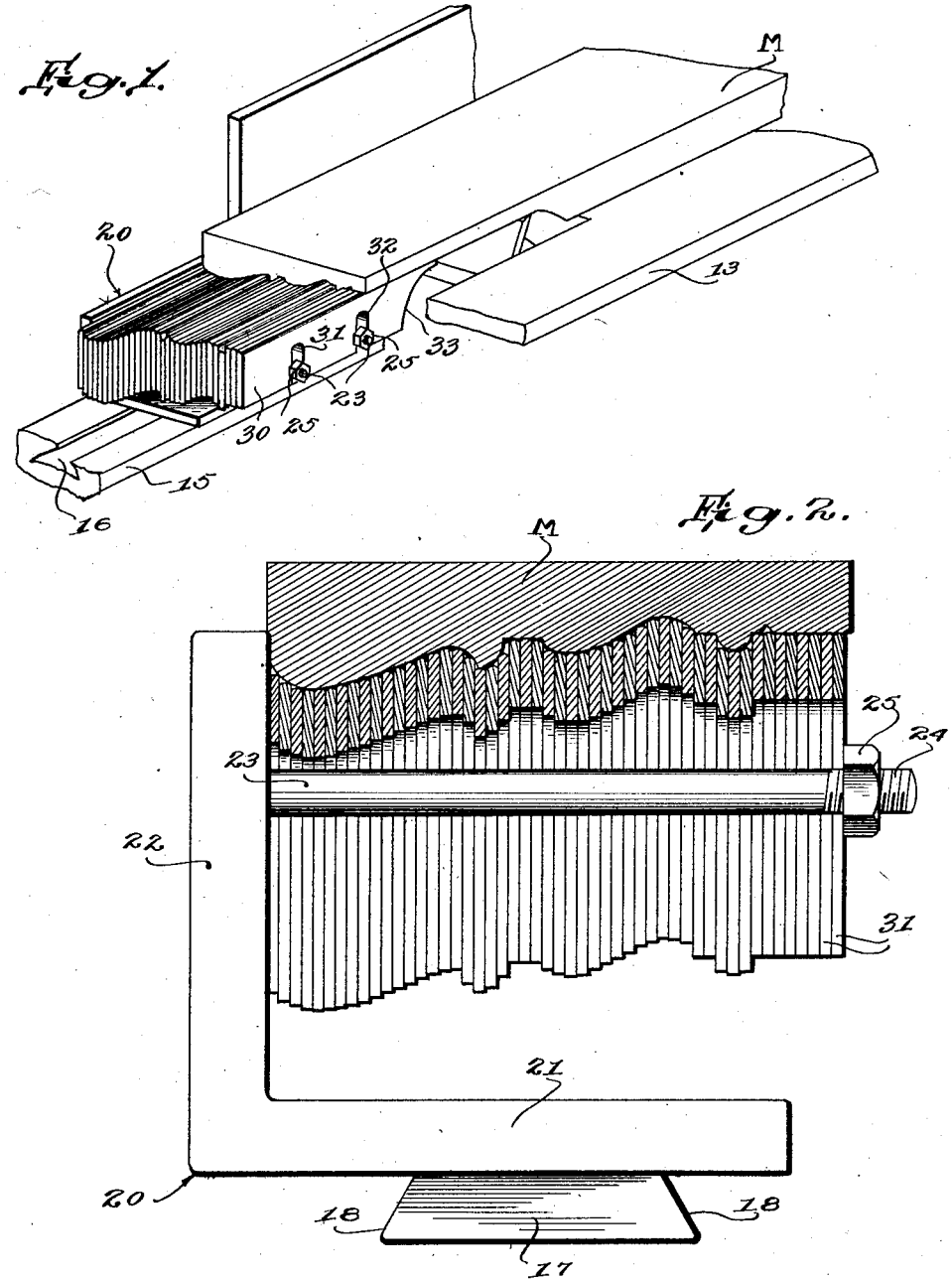
INVENTOR
RUSSELL G. DISHMAN
BY
ATTORNEY April 30, 1929.  R. G. DISHMAN  1,711,342
DEVICE FOR HOLDING MOLDINGS
Filed Feb. 10, 1928   2 Sheets-Sheet 2
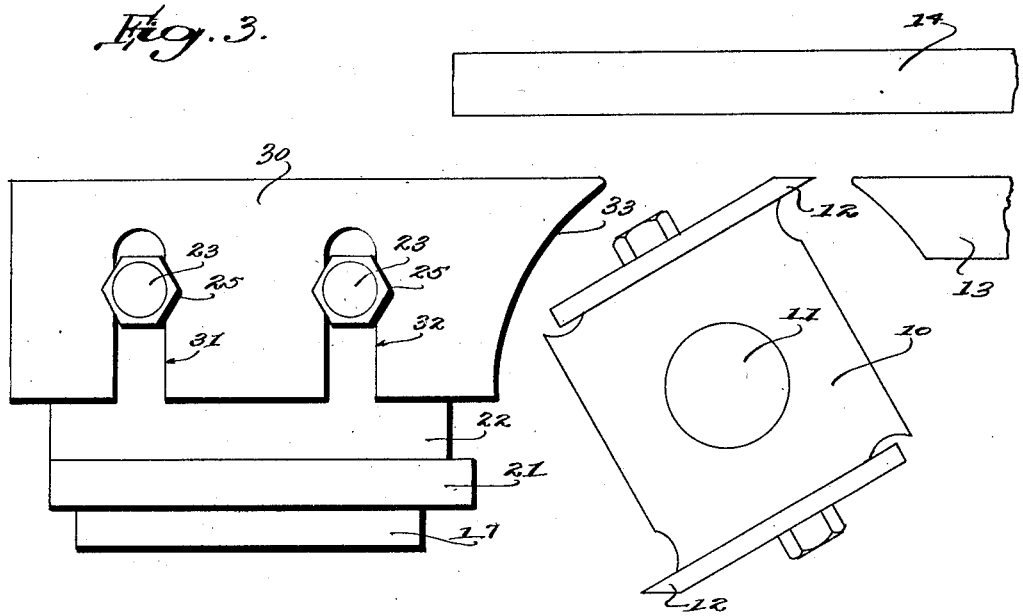
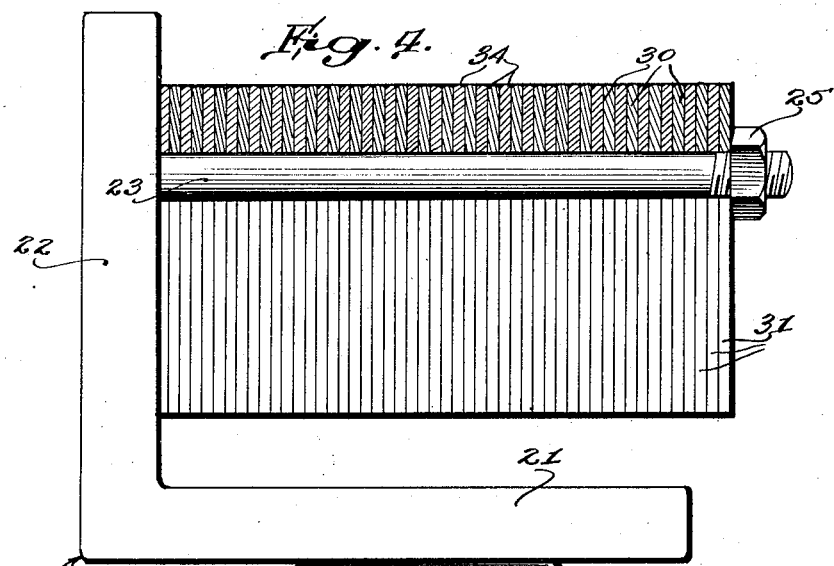
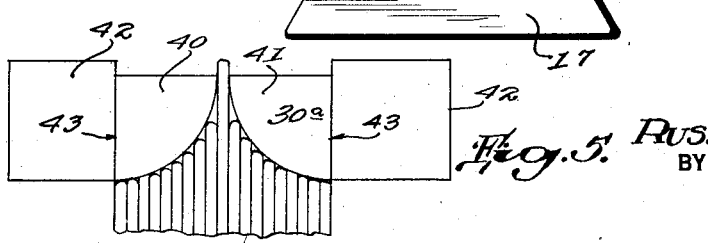
INVENTOR
RUSSELL G. DISHMAN
BY
ATTORNEY Patented Apr. 30, 1929.

1,711,342

UNITED STATES PATENT OFFICE.

RUSSELL G. DISHMAN, OF ANNISTON, ALABAMA.

DEVICE FOR HOLDING MOLDINGS.

Application filed February 10, 1928. Serial No. 253,468.

This invention relates to a device for retaining molding strips in position during the cutting operation.

In the present style of molding cutting machines, the material while being dressed is held in place by a pair of guides and a plate having limited contact with the molding at a point adjacent the cutting operation. However, the limited support at the spaced points provided by such means permits the ends of the molding freedom of movement with the result that the edges become torn or jagged, while an excessive vibration of the molding is set up, thereby causing the planing tool to produce marks, or when the molding is being sawed to cause miscuts.

An object of the invention is the provision of a support for a molding during the planing or cutting operation which is capable of being so applied to the configuration of the molding that the surface of said molding will be supported at all points.

A further object of the invention is the provision of a support for a molding during the cutting or planing operation, which is capable of such adjustment that it may be made to fit in a simple and efficient manner all points of the surface of any type of molding, throughout a sufficient length of the molding which will prevent vibration or misalinement of the ends of the molding.

This invention will be best understood from a consideration of the following detailed description; in connection with the accompanying drawings; nevertheless, it is to be understood that the invention is not confined to the disclosure being susceptible of such changes and modifications as shall define no material departure from the salient features of the invention as expressed in the appended claim.

In the drawings:—

Figure 1 is a view in perspective of a molding machine constructed according to the principles of my invention, Figure 2 is a transverse vertical section of a molding supporting device shown in position relative to a piece of molding, Figure 3 is a fragmentary side view of the molding machine, Figure 4 is a transverse vertical section of the molding supporting device shown in an inoperative position, Figure 5 is an end view of the supporting device shown applied to a different form of molding.

Referring more particularly to the drawings 10 designates a planer head revolved by a shaft 11 in any approved manner and provided with blades 12, which are adapted to be moved successively into engagement with the under face of the molding for producing the desired configuration. The molding is set upon a bed plate 13 and maintained in place by a pressure foot 14. All of the elements just described are well known in the art of molding machinery.

Located adjacent the cutter head 10 and in alinement with the bed plate 13 is a guide 15 having a undercut groove 16 for receiving a carriage 17 which has its side edges 18 inclined to conform to the inclination of the undercut portions of the groove 16.

An L-shaped bracket generally designated by the numeral 20 has a horizontal portion 21 rigidly secured to the carriage or sliding block 17 and a vertical portion 22 extending upwardly at right angles to the horizontal portion of the base member 21. A pair of bolts 23 are screwed into and secured in any approved manner, to the vertical portion 22 and are threaded at their outer ends, as shown at 24, to receive nuts 25.

A plurality of plates 30 are provided with alined slots 31 and 32 to receive the bolts 23. These slots extend normally for the greater portion of the width of the plates and open through the lower edge of said plates so that the said plates may be readily positioned on the bolts by lowering the same to permit the bolts to ride upwardly through the said slots. The inner edge of each plate is cut away along an arcuate curve, as shown at 33, adjacent the cutter head 10 to provide for freedom of movement of the cutter head, while extending the upper supporting edges 34 of the plates in close association with the cutter head.

The supporting device, as shown in Fig. 5, is applied to a different form of molding and in which the centrally disposed plate 30ª is elevated sufficiently for separating a pair of moldings 40 and 41. Guide blocks 42 engage the adjacent faces 43 of the moldings.

The operation of my device is as follows:

The work to be planed is run over the bed plate 13 and maintained in position by the pressure foot 14, while the head 10 is rotating. The knives 12 plane the under face of the work while the same is being fed to the supporting plates 30. When the molding reaches the position where it may be engaged by the supporting plates the nuts 25 are loosened and the plates are moved upwardly until they engage the planed surface of the molding. Due to the fact that a sufficient number of the plates are provided, and also due to the fact that the plates are made relatively thin they can be moved to such a position that their upper edges 34 will engage or conform to the configuration of the molding. As soon as the plates have been positioned the nuts are tightened for maintaining the plates in position. The cutter head 10 may then be revolved and the molding will be properly supported at all points while being planed and fed through the machine.

The molding will not only be supported at all points during the planing of the work, but as shown more particularly in Fig. 5, the inner adjacent edges of the molding strips which are simultaneously formed and cut will be maintained in proper position and against vibration.

It is possible to omit one of the bolts 23 so that the series of plates may be swung on a pivot until their inner edges engage the molding. By this construction the molding is supported on the inner edges of the plates instead of throughout the entire length of said plates. The molding or piece of work M which is being operated on by the cutter head 10 has its inner face resting upon the opposite parallel face which is always in engagement adjacent the cutter head with the under face of the pressure foot 14.

I claim:—

In a molding cutting machine, a table, a guide supported on the table, a bracket having a base member and an upstanding member with the base member slidably mounted on the guide, spaced parallel bolts rigidly secured to the upstanding arm of the bracket and projecting over the base member, molding supporting plates provided with elongated slots opening through the bottom edge thereof and receiving the bolts, said plates being adjustable relative to each other over the base member and spaced from said base member, means threaded onto the bolts for clamping the plates in position when adjusted to fit a strip or molding passing through the cutting machine, the ends of the plates where the strip of molding enters in supported relation on the plates being tapered.

Signed at Anniston in the county of Calhoun and State of Alabama this 7th day of February A. D. 1928.

RUSSELL G. DISHMAN.